US009298753B2

(12) United States Patent
Ray et al.

(10) Patent No.: US 9,298,753 B2
(45) Date of Patent: Mar. 29, 2016

(54) RESOLVING PAIRWISE LINKS TO GROUPS

(71) Applicant: Wal-Mart Stores, Inc., Bentonville, AR (US)

(72) Inventors: Andrew Benjamin Ray, Bentonville, AR (US); Nathaniel Philip Troutman, Seattle, WA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 207 days.

(21) Appl. No.: 13/907,723

(22) Filed: May 31, 2013

(65) Prior Publication Data

US 2014/0358920 A1 Dec. 4, 2014

(51) Int. Cl.
*G06F 17/30* (2006.01)
(52) U.S. Cl.
CPC ................................ *G06F 17/30303* (2013.01)
(58) Field of Classification Search
CPC ................................ G06F 9/465; G06F 9/541
See application file for complete search history.

(56) References Cited

U.S. PATENT DOCUMENTS

| 8,046,348 | B1 * | 10/2011 | Rehling et al. | 707/708 |
| 2006/0116120 | A1 * | 6/2006 | Hurst | H04W 24/00 455/424 |
| 2006/0221837 | A1 * | 10/2006 | Gardner | H04L 29/06027 370/241 |

* cited by examiner

*Primary Examiner* — Syed Hasan
*Assistant Examiner* — Thu Nga Nguyen
(74) *Attorney, Agent, or Firm* — Bryan Cave LLP

(57) ABSTRACT

The present invention extends to methods, systems, and computer program products for resolving pairwise links to groups. Embodiments of the invention use an iterative algorithm to transform a collection of pairwise links to groups of records that correspond to the same entity. The algorithm can be stopped after any number of iterations for an increasing accurate approximation result. The algorithm essentially guarantees a correct solution for groups of size up to the number of iterations. This algorithm scales linearly on the size of the record set, with little impact from the number of links.

20 Claims, 7 Drawing Sheets

300

For one or more iterations over a plurality of records until a stop condition is satisfied, each iteration including:

Accessing a plurality of active neighborhood data structures, each active neighborhood data structure corresponding to a different specified record from among the plurality of records, each neighborhood data structure including a record identifier as a label, the record identifier corresponding to a record included in the plurality of records, the neighborhood data structure also including an activity state indicator and a neighborhood, the activity state indicator indicating whether or not the neighborhood data structure is active, the neighborhood including list of record identifiers for other records expressly linked to the specified record by a pairwise link, the other records also included in the plurality of records
301

For each neighborhood data structure, creating a message for each of the other records expressly linked to the record, the message including the label and the activity indicator for the neighborhood data structure
302

Subsequent to creating the messages, grouping neighborhood data structures and messages by record identifier such that each group includes one neighborhood data structures and one or more messages
303

For each grouping of a neighborhood data structure and messages, setting the label for the neighborhood data structure to the minimum record identifier included in the neighborhood data structure and messages
304

When the minimum record identifier for a grouping of a neighborhood data structure and messages is the record identifier for the specified record, removing the neighborhood data structure from plurality of active neighborhood data structure by setting the activity indicator to indicate that the neighborhood data structure is not active
305

*Fig. 3*

Computer System 600

Neighborhood Creation:

Group Links 510 By Record ID 511, Such That Each Link 510 Is In Two Groups. For Each Group, Create A Neighborhood 513 With An Initial State 514 Of Active = True And Label = Record Id.
601

Message Passing Iteration:

Map Phase:

For Each Neighborhood 513, If It Is Active 523, Create Messages 520 For Each Record Id 511 Of A Neighbor 516 In The Neighbor List 515 With A Payload 521 Consisting Of The Current Label 522 In The State 514 Of The Neighborhood 513.
602

Reduce Phase:

Messages 520 And Neighborhoods 513 Are Grouped By Record Id 511. Each Group Consists Of One Neighborhood 513 And Some Number Of Messages 520.
603

In Each Group The State 514 Of The Neighborhood 513 Is Updated As A Function Of The Current State 514 And The Payload 521 Of The Messages 520. 604

A Function Takes The Minimum Of The Labels Between The State And The Messages As The New Label For The State And Set Active To True If The Label Has Changed And False Otherwise. 605

Stopping Condition:

If All Neighborhoods Are Not Active Or Some Other Stopping Condition Has Been Reached, Such As A Maximum Of Iterations, Go On To The Next Step. Otherwise, Do Another Iteration Of Message Passing. 606

Match Key Creation:

For Each Neighborhood 513, Write Out Record Id 511 With The Corresponding Label 522. 607

*Fig. 6*

RESOLVING PAIRWISE LINKS TO GROUPS

CROSS-REFERENCE TO RELATED APPLICATIONS

Not applicable.

BACKGROUND

1. Field of the Invention

The present invention relates generally to identifying groups of records correspond to the same entity with larger datasets, and, more particularly, to resolving a plurality of pairwise links of records into one or more groups of records corresponding to the same entity.

2. Related Art

There are many avenues for a customer to acquire goods or products that meet their needs or wants. One way for a customer to acquire goods is through the use of a retailer. Depending on the market strategy of the retailer, there are many different avenues for retailers to sell products. For example, retailers can sell products in physical store locations (e.g., department stores, discount stores, warehouse stores, supermarkets, etc.), online, and even through vending machines.

Given the large number of choices for a consumer to acquire products, it becomes expedient for retailers to do their best to attract and retain customers. For example, retailers may need to keep their prices low relative to their competition to attract and retain customers. Further, retailers may need to provide a good or product that is not readily available through other retail options. Without staying competitive, retail stores may have a weakened customer base, and, in turn, lose their profitability.

In order for a retail store to better meet the needs of their customers, retail stores have an interest in the shopping patterns of their customers. As understanding of customer shopping habits and tendencies increases, a retailer can offer incentives such as coupons or rebates to entice its customers to make more purchases or purchase items that may be unfamiliar to a customer. This both improves the customer shopping experience and increases retailer profit margin. Also, customer shopping experience improves, customers may be more likely to refer their friends to user the retailer (e.g., visit a store, go to the Website, etc.).

There are many ways for a store to observe the shopping habits of their customers. One way is issuing a membership card to its customers. As the customer checks out, the customer card is scanned. The store database can then keep track of which items the customer purchases, and how often the purchases are made. The store incentivizes the customer to use the card by offering reduced prices for purchases made with the card.

In addition to membership cards, retail stores can also track the shopping patterns of their customers through a customer's online activity. The store can track which items the customer viewed on their website, which items the customer searched for using the website's search feature, which items they added to their online cart, and which items they purchased.

Further, if the customer pays with a check or credit card, the store can determine if the customer has a profile within the store's database, and can associate the customer's purchases, credit card, checking account, etc., with the customer's profile.

Given the many avenues for customer's to make purchases, it becomes increasingly for a retailer to match a particular customer to all of their interactions with the retailer. For example, some of the customer's purchases may be made online with one credit card, other purchases may be made at a store with a different credit card, and remaining purchases may be made using a membership card and paying by cash or check. In addition, many retail stores have more than one type of retail store. For example, some retailers may operate both a discount store and a warehouse store. Identifying a customer of the discount store and a customer of the warehouse store as the same customer can be difficult.

As retail stores accumulate customer data through purchases or other interactions, an enormous amount of data is created, for example, for some retailers billions of records. As mentioned previously, many of these records may have been created through different types of customer interaction; whether they bought the items online, with a membership card, with a credit card, at the retailer's discount store, at the retailer's warehouse store, or some combination thereof. It can be very challenging to sort through the vast amount of records in order to associate each record with the customer that created the record.

BRIEF DESCRIPTION OF THE DRAWINGS

The specific features, aspects and advantages of the present invention will become better understood with regard to the following description and accompanying drawings where:

FIG. 3 illustrates a flow chart of an example method for resolving pairwise links into groups.

FIG. 6 illustrates a flow chart of an example method for resolving pairwise links into groups.

DETAILED DESCRIPTION

Figure 1:
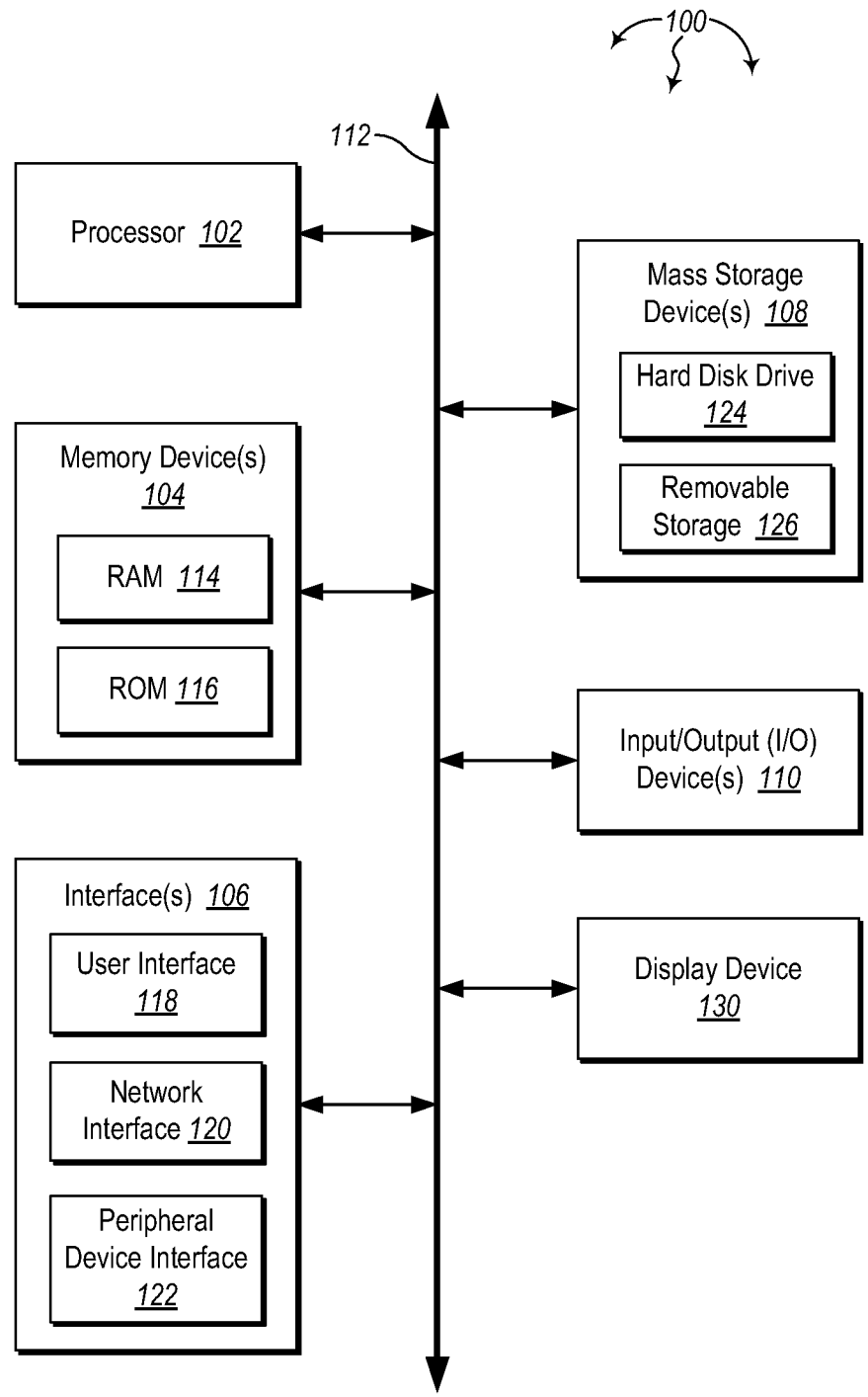
FIG. 1 illustrates an example block diagram of a computing device.

The present invention extends to methods, systems, and computer program products for resolving pairwise links to groups. A computer system iterates over a plurality of records until a stop condition is satisfied. For each iteration, a plurality of active neighborhood data structures is accessed. Each active neighborhood data structure corresponds to a different specified record from among the plurality of records. Each neighborhood data structure includes a record identifier as a label. The record identifier corresponds to a record included in the plurality of records. Each neighborhood data structure also includes an activity state indicator and a neighborhood. The activity state indicator indicates whether or not the neighborhood data structure is active. The neighborhood includes a list of record identifiers for other records expressly linked to the specified record by a pairwise link. The other records also included in the plurality of records.

During a map phase, for each neighborhood data structure, a message is created for each of the other records expressly linked to the record. The message includes the label and the activity indicator for the neighborhood data structure. Subsequent to creating the messages, data structures and messages are grouped by record identifier. Accordingly, each grouping includes one neighborhood data structure and one or more messages.

During a reduce phase, for each grouping of a neighborhood data structure and messages, the label for the neighborhood data structure is set to the minimum record identifier included in the neighborhood data structure and messages. When the minimum record identifier for a grouping of a neighborhood data structure and messages is the record identifier for the specified record, the neighborhood data structure is removed from plurality of active neighborhood data structure by setting the activity indicator to indicate that the neighborhood data structure is not active.

In some embodiments, a stop condition is detecting that no neighborhood data structure are active. In other embodiments, a stop condition is reaching a specified maximum number of iterations.

Some embodiments include a neighborhood creation phase where the plurality of active neighborhood data structures is created. Some embodiments also include a group label creation phase where neighborhood data structures are transformed to groups by writing out the record identifier and label for each neighborhood data structure.

During each phase, data can be written to disk as it is processed so that larger (and potentially extremely large) datasets can be handled.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Hardwired connections can include, but are not limited to, wires with metallic conductors and/or optical fibers. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc, networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
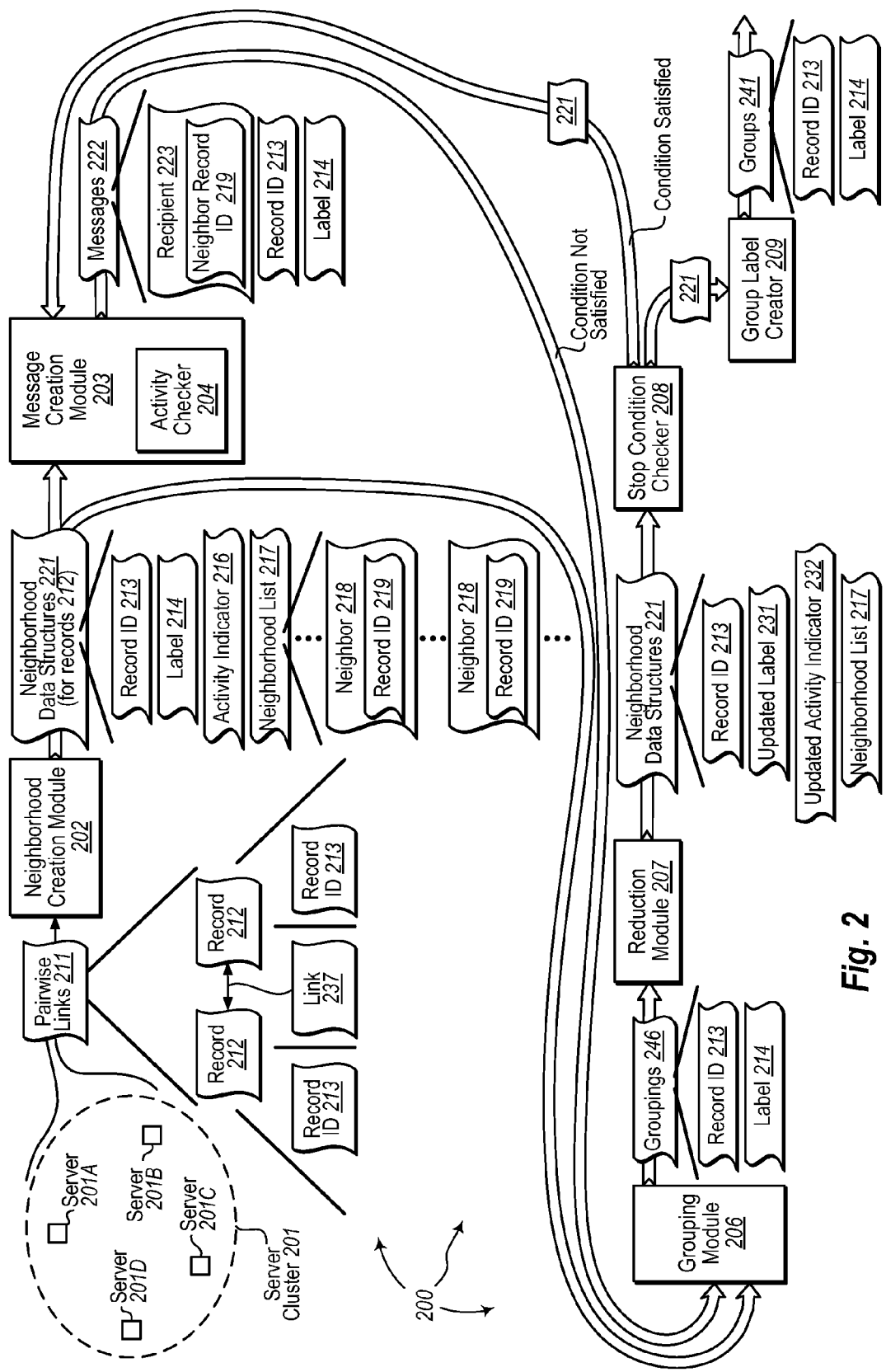
FIG. 2 illustrates an example computer architecture for resolving pairwise links into groups.

FIG. 2 illustrates an example computer architecture 200 for resolving pairwise links to groups. Referring to FIG. 2, computer architecture 200 includes server cluster 201, neighborhood creation module 202, message creation module 203, grouping module 206, reduction module 207, stop condition checker 208, and group label creator 209. Each of server cluster 201, neighborhood creation module 202, message creation module 203, grouping module 206, reduction module 207, stop condition checker 208, and group label creator 209 as well as their respective components can be connected to one another over (or be part of) a system bus and/or a network, such as, for example, a PAN, a LAN, a WAN, and even the Internet. Accordingly, server cluster 201, neighborhood creation module 202, message creation module 203, grouping module 206, reduction module 207, stop condition checker 208, and group label creator 209 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Server cluster 201 includes a plurality of servers including servers 201A-201D. Each server in server cluster 201 can store a plurality of pairwise links. Each pairwise link can expressly link two records together. In some embodiments, pairwise links stored in server cluster 201 link together records related to a retailer's interaction with their customers, such as, for example, sales transactions, offered promotions, etc. Servers in server cluster 201 can store pairwise links for various different portions of a retailers business, such as, for example, discount stores, warehouse stores, supermarkets, online, etc. Links and records in server cluster 201 can be stored in flat files or databases.

As depicted, server cluster 201 includes pairwise links 211. Each pairwise link 211 links together two records 212. Each of the two records 212 can store different customer interaction data that is expressly linked to one another. For each pairwise link 211, link 237 can indicate an express relationship between the two records 212. In some embodiments, link 237 can be associated with metadata indicating a level of confidence in the link as well as the owner of the link (e.g., the algorithm that created the link). Each record 212 includes a record ID 213 identifying the record 212.

The number of links and records in server cluster 201 may be so large that other computing systems owned by the retailer lack sufficient memory resource to resolve the pairwise links in memory.

In general, neighborhood creation module 202 is configured to access a plurality of pairwise links and create neighborhood data structures from the plurality of pairwise links. Neighborhood creation module 202 can store created neighborhood data structures to a mass storage device (e.g., similar to mass storage device(s) 108). For example, neighborhood creation module 202 can access pairwise links 211 and create neighborhood data structures 221. After creation, neighborhood creation module 202 can store neighborhood data structures 221 to a local mass storage device.

A neighborhood data structure 221 can be created for each record 212 included in at least one pairwise link 211. Each neighborhood data structure 221 includes a record ID 213, a label 214, an activity indicator 216, and a neighborhood list 217. Record ID 213 is the identifier for the record 212 corresponding to the neighborhood data structure 221. Label 214 stores a minimum record ID 213 known to be linked to the record 212. Activity indicator 216 indicates if the neighborhood data structure 221 is active or inactive with respect to message passing. When a neighborhood data structure 221 is initially created, the activity indicator 216 is set to indicate that the neighborhood data structure 221 is active with respect to message passing.

Neighborhood list 217 further includes a list of neighbor records 218 (i.e., other records 212) that were linked to the record 212 by a pairwise link. The record ID 219 is indicated for each neighbor record 218. Record ID 219 and record ID 213 are from the same set of record IDs are used to distinguish record IDs for neighbor records from other users of record IDs.

In general, message creation module 203 is configured to access neighborhood data structures (e.g., previously stored at a local mass storage device) and create messages for delivery to records in corresponding neighborhood lists. Message creation module 203 can store created messages to a local mass storage device. For example, message creation module 203 can create messages 222 from neighborhood data structures 221. After creation, message creation module 203 can store messages 222 to a local mass storage device.

Each message can include a recipient 223 identified by neighbor record ID 219, a record ID 213 identifying the sending neighborhood data structures 221, and a label 214 from sending neighborhood data structures 221. Using messages 222 each record can make their neighbor records aware of a minimum record ID 213 to which they are linked.

Activity checker 204 is configured to check activity indicator 216 for each neighborhood data structure 221 prior to permitting creation of messages 222 for neighborhood data structure 221. When activity indicator 216 indicates that a neighborhood data structure 221 is not active. Messages 222 are not created for that neighborhood data structure 221.

In general, grouping module 206 is configured access neighborhood data structures and messages (e.g., previously stored at a local mass storage device) and create groupings of neighborhood data structures and messages based on record IDs 213. Grouping module 206 can store created groupings to a local mass storage device. For example, grouping module 206 can access neighborhood data structures 221 and messages 222 and create groupings 246. After creation, grouping module 206 can store groupings 246 to a local mass storage device.

Each grouping 246 includes a neighborhood data structure 221 and one or more messages 220. For each message 220 in a grouping 246, the neighbor record ID 219 used when creating the message 220 corresponds to the record ID 213 for neighborhood data structure 221.

In general, reduction module 207 is configured to access groupings (e.g., previously stored at a local mass storage device) and update labels and activity indicators in neighborhood data structures. Reduction module 207 can store update neighborhood data structures to a local mass storage device. For example, reduction module 207 can access groups 246 and update labels and activity indicators in neighborhood data structures 221. After updating, reduction module 207 can store updated neighborhood data structures 221 to a local mass storage device.

As depicted, reduction module 207 can output neighborhood data structures 221 with update labels 231 and updated activity indicators 232. Upon accessing a grouping 246, reduction module 207 determines the lowest record ID 213 for a label 214 in any of messages 220. Reduction module 207 then determines this lowest record ID 213 is less than the record ID 213 for label 214 in neighborhood data structures 221. If so, reduction module 207 replaces label 214 with updated label 231 (i.e., label 214 from the message 220). Updated label 231 stored the determined lowest record ID 213 from messages 220. If not, reduction module 207 updates activity indicator 232 to updated activity indicator 232 to indicate that the neighborhood data structure 221 is not active with respect to message passing (i.e., since no lower record ID 213 was identified). Updated activity indicator 232 prevents message creation for the neighborhood data structure 221 on subsequent iterations.

A minimum record identifier can be determined using a designated lexographical order for record identifiers.

Stop condition checker 208 is configured to check a stop condition on each iteration. When a stop condition is not satisfied, message creation module 203 is permitted to again access (updated) neighborhood data structure 221s and create messages 220. When a stop condition is satisfied, group label creator 209 is permitted to access (updated) neighborhood data structures 221.

In general, group label creator 209 is configured to access (updated) neighborhood data structures (e.g., previously stored at a local mass storage device) and create groups. Group label creator can store groups to a local mass storage device. For example, group label creator 209 can access (updated) neighborhood data structures 221 and create groups 241. After creation, group label creator 209 can store groups 241 to a local mass storage device.

For each (updated) neighborhood data structure 221, a corresponding group 214 contains a record ID 213 and an updated label 231 (or label 213 when no updates occur).

FIG. 3 illustrates a flow chart of an example method 300 for resolving pairwise links into groups. Method 300 will be described with respect to the components of computer architecture 200.

The acts of method 300 can be performed for one or more iterations over a plurality of records until a stop condition is satisfied. For example, one or more iterations of method 300 can be performed over pairwise links 211.

Method 300 includes accessing a plurality of active neighborhood data structures, each active neighborhood data structure corresponding to a different specified record from among the plurality of records, each neighborhood data structure including a record identifier as a label, the record identifier corresponding to a record included in the plurality of records, the neighborhood data structure also including an activity state indicator and a neighborhood, the activity state indicator indicating whether or not the neighborhood data structure is active, the neighborhood including list of record identifiers for other records expressly linked to the specified record by a pairwise link, the other records also included in the plurality of records (301). For example, message creation module 203 can access active neighborhood data structures 221 (i.e., neighborhood data structures 221 having an activity indicator 216 indicative being active for message passing).

Method 300 includes for each neighborhood data structure, creating a message for each of the other records expressly linked to the record, the message including the label and the activity indicator for the neighborhood data structure (act 302). For example, message creation module 203 can create messages 220.

Method 300 includes, subsequent to creating the messages, grouping neighborhood data structures and messages by record identifier such that each group includes one neighborhood data structures and one or more messages (303). For example, grouping module 206 can create groupings 246.

Method 300 includes, for each grouping of a neighborhood data structure and messages, setting the label for the neighborhood data structure to the minimum record identifier included in the neighborhood data structure and messages (304). For example, where appropriate, (when a message contains the minimum record identifier) reduction module 207 can update neighborhood data structures 221 with updated labels 231. When the record ID 213 in the neighborhood data structure 221 is the minimum record identifier, a label 214 is not updated.

Method 300 includes when the minimum record identifier for a grouping of a neighborhood data structure and messages is the record identifier for the specified record, removing the neighborhood data structure from plurality of active neighborhood data structure by setting the activity indicator to indicate that the neighborhood data structure is not active (305). For example, when the record ID 213 in the neighborhood data structure 221 is the minimum record identifier, reduction module 207 can update activity indicator 216 to updated activity indicator 232. Updated activity indicator 232 can indicate that the corresponding neighborhood data structure 221 is not active with respect to message passing.

When the stop condition is satisfied, group label creation 209 can write out groups 241.

Figure 4:
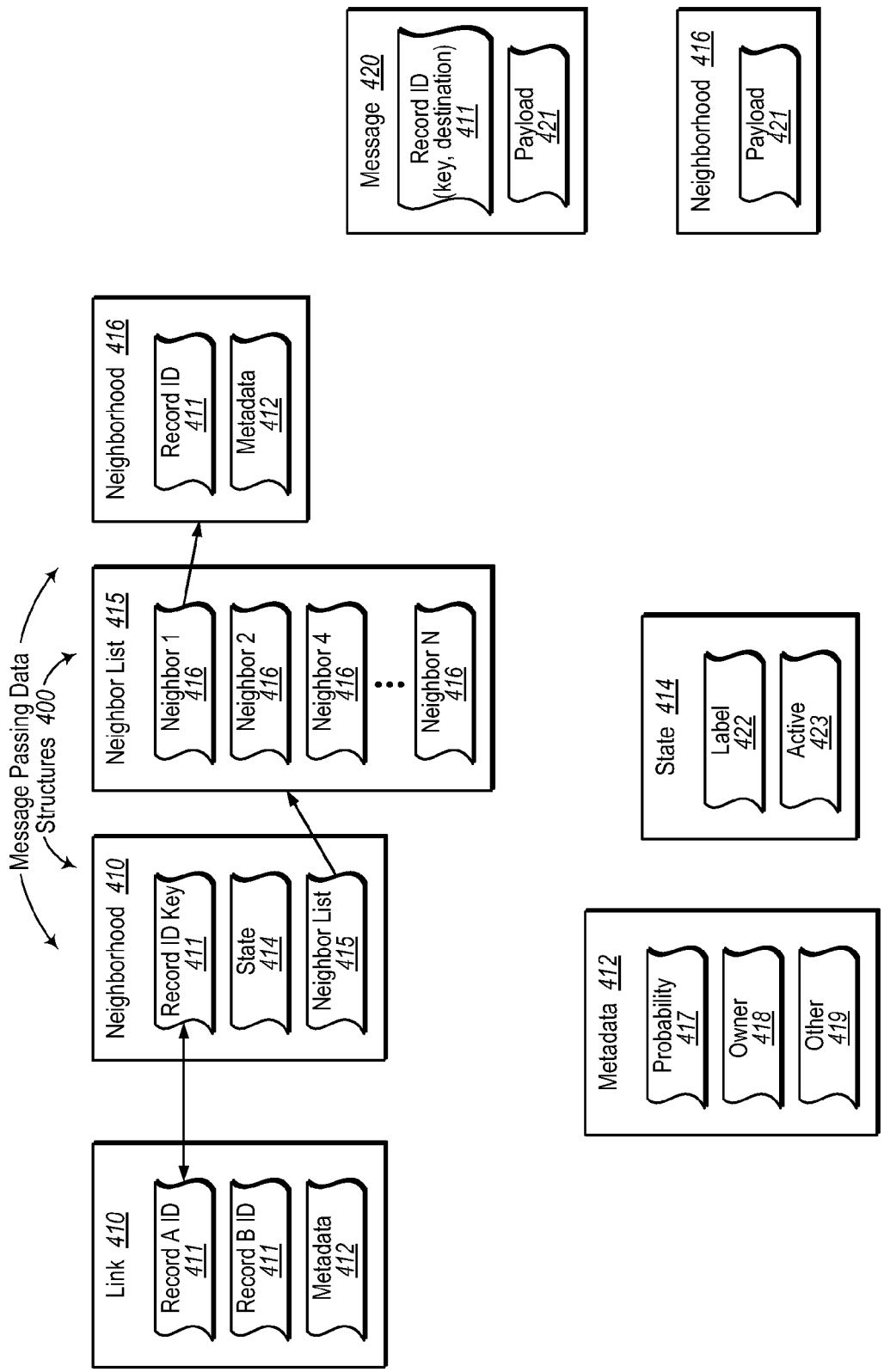
FIG. 4 illustrates example of message passing data structures.

FIG. 4 illustrates example of message passing data structures 400. As depicted a link 410 can include record A ID 411, record B ID 411, and metadata 412. Each record ID 411 can be used as a key for a neighborhood 413. Metadata 412 can contain probability 417, owner 418, and other 419. Probability 417 is a probability assigned by the algorithm creating links as an indication of its confidence in the link. In some embodiments, probability 417 can be considered when making decisions with respect to label updates. Owner 418 contains information which algorithm created this link. In some embodiments, multiple different models and a collection of rules can be used. The data in owner 418 can help identify the model or rule that created the link. Other 419 can contain other useful data, such as, for example, the date link was created.

Each neighborhood 413 is keyed by a record ID 411 can includes state 414 and neighbor list 415. State 414 contains label 422 and active 423. Label 422 stores the minimum record ID that has been identified as linked the record ID (Key) 411. Active 423 indicated whether or not the neighborhood 413 is active for messaged passing. Neighbor list 415 contains one or more neighbors 416. Each neighbor 416 is identifier by a record ID and also contains metadata 412.

As depicted, a message 420 contains a destination record ID and a payload 412. The payload 412 contains a label 422. Label 422 stores the minimum record ID that has been identified as linked the record ID (Key) 411 that sent the message 420.

Figure 5A:
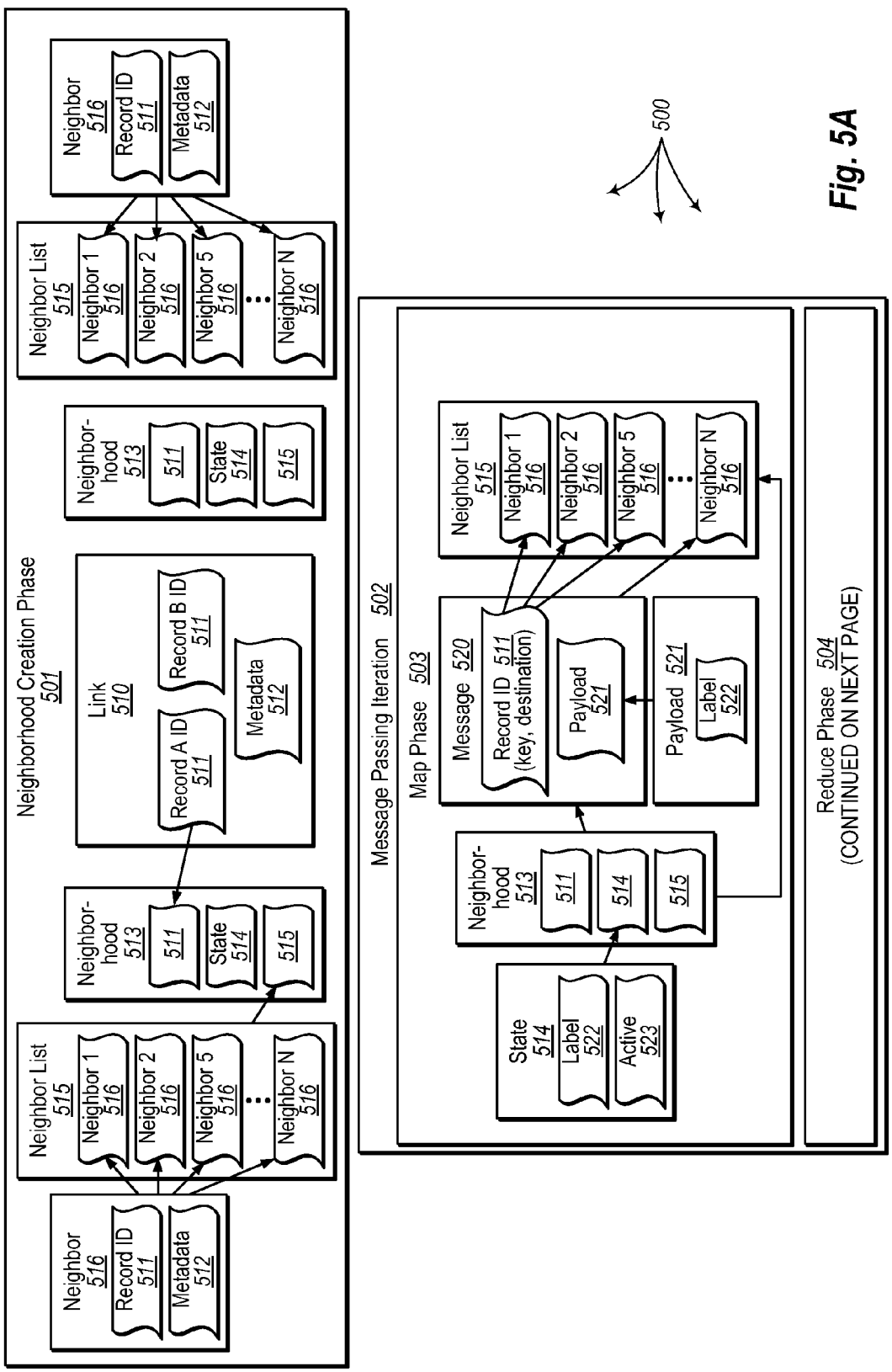
FIGS. 5A and 5B illustrate a data flow diagram of various different example phases used when resolving pairwise links into groups.
Figure 5B:
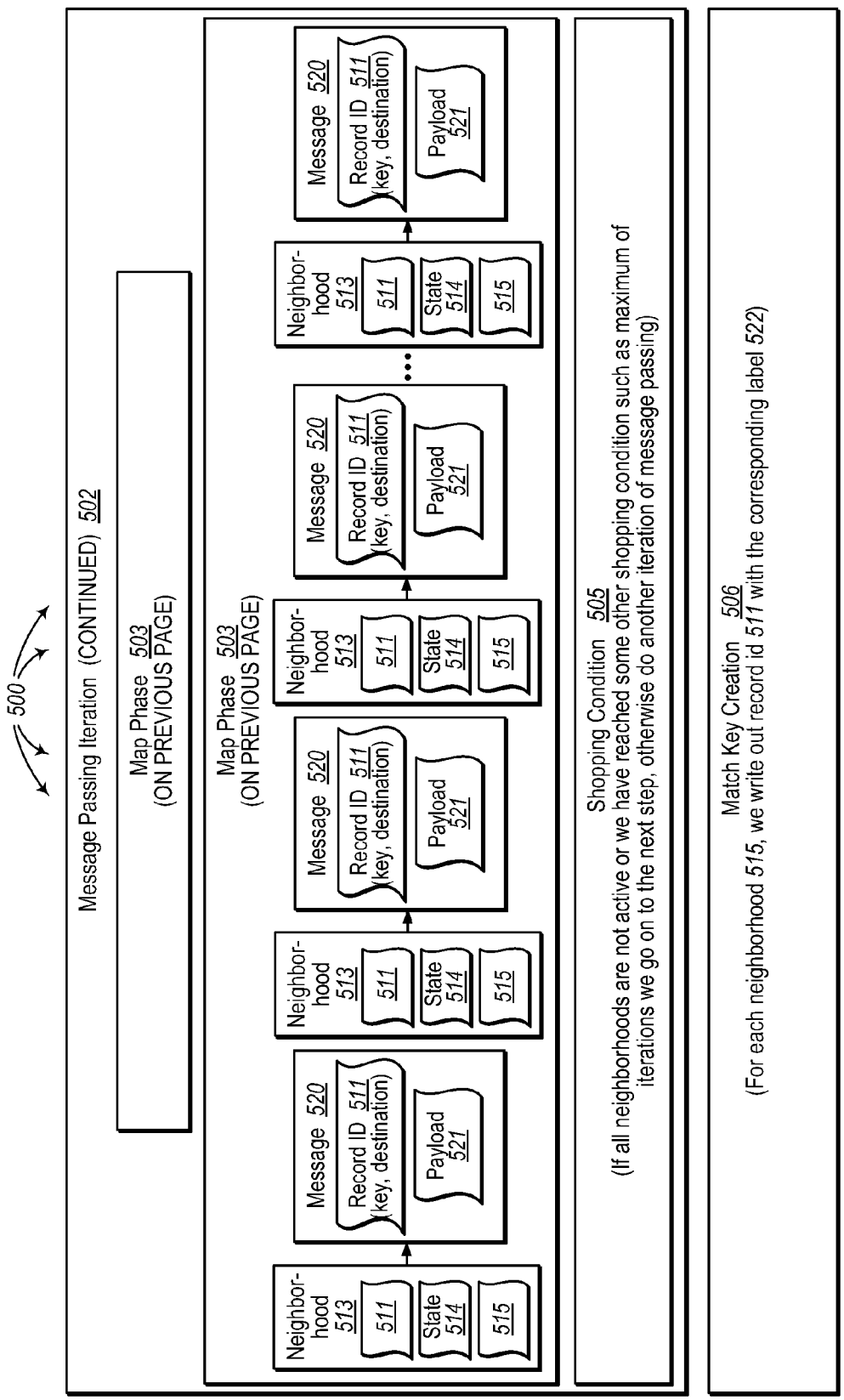

FIGS. 5A and 5B illustrate data flow diagram 500 of various different example phases used when resolving pairwise links into groups. FIG. 6 illustrates a flow chart 600 of an example method for resolving pairwise links into groups. Flow chart 600 will be described with respect to the phases and data elements in data flow diagram 500.

Method 600 includes grouping links 510 by record ID 511 such that each link 510 is in two groups. For each group, create a neighborhood 513 with an initial State 514 Of Active=True And Label=Record Id (601). In a neighborhood creation phase 501, a link 510 contains record A ID 511, record B ID 512, and metadata 512. Neighborhoods 513 are keyed to record A ID 511 and record B ID 512 respectively. Each neighborhood 513 contains state 514 and a neighbored list 515. Each neighborhood list contains a plurality of neighbors 516 identified by record ID 511 and also containing metadata 512. Similar references numbers are used to refer to similar elements, however the content of the elements may differ. For example, neighborhood lists 515 can differ by having different neighbors 516 identified by different record IDs 511, different neighbors 516 and links 510 can contain different metadata 514, etc.

For each neighborhood 513, if it is active 523, create messages 520 for each record Id 511 of a neighbor 516 in the neighbor list 515 with a payload 521 consisting of the current label 522 in state 514 of the neighborhood 513(602). Moving to message passing iteration 502, message passing iteration 502 includes map phase 503. In map phase 503, messages 520 are generated for each neighbor 516 in a neighborhood 513. Messages 520 contain a destination record ID 511 for the corresponding neighbor 516 and a payload 521. The payload 521 contains the label 522 from state 514.

Messages 520 and neighborhoods 513 are grouped by record ID 511. Each group consists of one neighborhood 513 and some number of messages 520 (603). In each group the state 514 of the neighborhood 513 is updated as a function of the current state 514 and the payload 521 of the messages 520 (604). A function takes the minimum of the labels between the state and the messages as the new label for the state and set active to True if the label has changed and False otherwise (605). As depicted, message passing iteration 502 also includes reduce phase 504. In reduce phase 504, messages destination record IDs 511 in massages 502 are matched to record IDs 511 in neighborhoods. Labels 522 in payloads 521 are compared to labels 522 in state 514. The label having the minimum record ID 511 is stored in label 522 of state 514. Thus, if a message has a label 522 with a lower record ID 511, the lower record ID 511 replaces the record ID 511 in label 522 of state 514.

If all neighborhoods are not active or some other stopping condition has been reach, such as a maximum number of iterations, go on to the next stop. Otherwise, do another iteration of message passing (606). For example, when a stopping condition 505 is satisfied, message passing iterations 502 stop. If stopping condition 505 is not satisfied, message passing iterations 502 can continue. For each neighborhood 513, write out record ID 511 with the corresponding label 522 (607). For example, after message passing iterations 502 are stopped, match key creation 506 can write out record IDs 511 with corresponding labels 522.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Accordingly, embodiments of the invention use an iterative algorithm to transform a collection of pairwise links to groups of records that correspond to the same entity. The algorithm can be stopped after any number of iterations for an increasing accurate approximation result. The algorithm essentially guarantees a correct solution for groups of size up to the number of iterations. This algorithm scales linearly on the size of the record set, with little impact from the number of links. Thus, the algorithm can be used on large data sets, including data sets on the order of a billion records and a trillion links.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A method for resolving a set of pairwise links to groups, the method comprising for one or more iterations over a plurality of records until a stop condition is satisfied, each iteration including:
    accessing a plurality of neighborhood data structures that are active, each neighborhood data structure of the plurality of neighborhood data structures corresponding to a different specified record from among the plurality of records, each neighborhood data structure of the plurality of neighborhood data structures including a record identifier as a label, the record identifier corresponding to a specified record included in the plurality of records, each neighborhood data structure of the plurality of neighborhood data structures also including an activity state indicator and a neighborhood, the activity state indicator indicating whether or not the neighborhood data structure is active, the neighborhood including a list of record identifiers for other records expressly linked to the specified record by a pairwise link, the other records also included in the plurality of records;
    for each neighborhood data structure of the plurality of neighborhood data structures, creating a message for each of the other records expressly linked to the specified record, the message including the label and the activity state indicator for the neighborhood data structure;
    subsequent to creating the messages, grouping the plurality of neighborhood data structures and the messages by the record identifiers such that each group includes one neighborhood data structure of the plurality of neighborhood data structures and one or more messages;
    for each grouping of the plurality of neighborhood data structures and the one or more messages, setting the label for the neighborhood data structures in the group to a minimum record identifier included in the group of the plurality of neighborhood data structures and the one or more messages; and
    when the minimum record identifier for a group of the plurality of neighborhood data structures and the one or more messages is the record identifier for the specified record of a particular neighborhood data structure, removing the particular neighborhood data structure from the plurality of neighborhood data structures that are active by setting the activity state indicator to indicate that the particular neighborhood data structure is not active.

2. The method as recited in claim 1, further comprising subsequent to the stop condition being satisfied, for each neighborhood data structure of the plurality of neighborhood data structures: writing out the label.

3. The method of claim 1, wherein the minimum record identifier is based on a lexicographical order associated with the record identifiers.

4. The method of claim 1, wherein the stop condition indicates a specified maximum number of the one or more iterations to perform.

5. The method of claim 1, wherein the stop condition is based on detecting that no neighborhood data structures of the plurality of neighborhood data structures are active.

6. The method claim 1, wherein one or more of the plurality of records is associated with a retail purchase transaction.

7. A computer program product for implementing a method for resolving a set of pairwise links to groups, the computer program product comprising one or more computer storage devices having stored thereon computer-executable instructions that, when executed at a processor, perform the method including one or more iterations over a plurality of records until a stop condition is satisfied, each iteration including:
    access a plurality of neighborhood data structures that are active, each neighborhood data structure of the plurality of neighborhood data structures corresponding to a different specified record from among the plurality of records, each neighborhood data structure of the plurality of neighborhood data structures including a record identifier as a label, the record identifier corresponding to a specified record included in the plurality of records, each neighborhood data structure of the plurality of neighborhood data structures also including an activity state indicator and a neighborhood, the activity state indicator indicating whether or not the neighborhood data structure is active, the neighborhood including a list of record identifiers for other records expressly linked to the specified record by a pairwise link, the other records also included in the plurality of records;
    for each neighborhood data structure of the plurality of neighborhood data structures, create a message for each of the other records expressly linked to the specified record, the message including the label and the activity state indicator for the neighborhood data structure;
    subsequent to creating the messages, group the plurality of neighborhood data structures and the messages by the record identifiers such that each group includes one neighborhood data structure of the plurality of neighborhood data structures and one or more messages;
    for each grouping of the plurality of neighborhood data structures and the one or more messages, set the label for the neighborhood data structures in the group to a minimum record identifier included in the group of the plurality of neighborhood data structures and the one or more messages; and
    when the minimum record identifier for a group of the plurality of neighborhood data structures and the one or more messages is the record identifier for the specified record of a particular neighborhood data structures, remove the particular neighborhood data structure from the plurality of neighborhood data structures that are active by setting the activity state indicator to indicate that the particular neighborhood data structure is not active.

8. The computer program product of claim 7, further comprising computer-executable instructions that, when executed subsequent to the stop condition being satisfied, for each neighborhood data structure of the plurality of neighborhood data structures, perform the method of: write out the label.

9. The computer program product of claim 7, wherein the minimum record identifier is based on a lexicographical order associated with the record identifiers.

10. The computer program product of claim 7, wherein the stop condition indicates a specified maximum number of the one or more iterations to perform.

11. The computer program product of claim 7, wherein the stop condition is based on detecting that no neighborhood data structures of the plurality of neighborhood data structures are active.

12. At a computer system, the computer system including one or more processors, a system memory, and one or more local storage devices, the computer system communicatively coupled to a cluster of servers, a plurality of pairwise links of records being stored across the cluster of servers, each pairwise link of records of the plurality of pairwise links of records including a pair of records that correspond to a same entity, each record of the pair of records being identified by an assigned identifier, the system memory being insufficient to store an entirety of the plurality of pairwise links of records, a method for resolving the plurality of pairwise links of records into one or more groups of the records corresponding to the same entity, the method comprising:
- a neighborhood creation phase, including for each of the records:
  - creating a neighborhood data structure for the record, the neighborhood data structure comprising a list of neighbors, the neighbors being other records linked to the record in at least one pairwise link of the plurality of pairwise links of records, the other records included in the records; and
  - writing the neighborhood data structure from the system memory to the one or more local storage devices;
- a message passing phase, including using a map reduce technique to determining a label values for the neighborhood data structures, each label value of the label values representing a minimum identifier associated with the neighborhood data structure, including for each neighborhood data structure of the neighborhood data structures:
  - setting the label value for the neighborhood data structure to the minimum identifier from among the assigned identifiers included in the neighborhood data structure;
  - for one or more iterations until a specified condition is satisfied and for each neighborhood data structure that is marked as active:
    - passing the label value as a message to the neighbors of the record that are included in the neighborhood data structure; and
    - writing the message from the system memory to the one or more local storage devices;
- a reduce phase for each neighborhood data structure of the neighborhood data structures, including:
  - collecting the messages from the other records included in the neighborhood data structures, the collected messages containing other label values for the other records included in the neighborhood data structure,;
  - determining a minimum value from among the other label values contained in the collected messages;
  - replacing the label value of the neighborhood data structure with the minimum value when the minimum value is less than the label value;
  - marking the neighborhood data structure as inactive when the minimum value is not less than the label value; and
  - writing the label value for the neighborhood data structure from the system memory to the one or more local storage devices when the label value has been replaced with the minimum value; and
- a group label creation phase, including subsequent to satisfying the specified condition and for each of the neighborhood data structures:
  - transforming the neighborhood data structure into a map of record identifiers to the label value; and
  - writing the map of record identifiers to the one or more local storage devices.

13. The method of claim 12, wherein the minimum identifier is based on a lexicographical order associated with the assigned identifiers.

14. The method of claim 12, wherein the specified condition indicates a specified maximum number of the one or more iterations to perform.

15. The method of claim 12, wherein the specified condition is based on detecting that no neighborhood data structures are active.

16. The method claim 12, wherein one or more of the records is associated with a retail purchase transaction.

17. The method of claim 12, wherein creating the neighborhood data structure for the record comprises creating the neighborhood data structure that contains the assigned identifiers for the other records included in a pairwise link of the plurality of pairwise links of records with the record.

18. The method of claim 12, wherein the specified condition is satisfied prior to all of the neighborhood data structures being marked as inactive.

19. The method of claim 12, wherein the records are stored in one or more flat files.

20. The method of claim 12, wherein the records are stored in a database.

* * * * *